(12) United States Patent
Jacobowitz et al.

(10) Patent No.: US 7,062,166 B2
(45) Date of Patent: Jun. 13, 2006

(54) FIRST AND SECOND DERIVATIVE PROCESSING OF WAVELENGTH MULTIPLEXED OPTICAL SIGNALS

(75) Inventors: Lawrence Jacobowitz, Wappingers Falls, NY (US); Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 954 days.

(21) Appl. No.: 09/963,258

(22) Filed: Sep. 26, 2001

(65) Prior Publication Data

US 2003/0058510 A1 Mar. 27, 2003

(51) Int. Cl.
*H04B 10/08* (2006.01)
*H04B 10/04* (2006.01)
*H04J 14/02* (2006.01)

(52) U.S. Cl. ............................. 398/32; 398/95; 398/196
(58) Field of Classification Search ................... 398/16, 398/23, 25, 31, 32, 33, 94, 95, 158, 162, 398/196, 197
See application file for complete search history.

(56) References Cited

U.S. PATENT DOCUMENTS

| | | |
|---|---|---|
| 3,777,154 A | 12/1973 | Lindsey |
| 3,943,021 A | 3/1976 | Lindsey |

(Continued)

FOREIGN PATENT DOCUMENTS

| | | |
|---|---|---|
| EP | 0 486 208 A2 | 5/1992 |
| EP | 0 571 037 A1 | 11/1993 |
| EP | 0 911 658 A1 | 4/1999 |
| JP | 6-19838 | 1/1994 |
| WO | WO 94/18587 | 8/1994 |
| WO | WO 94/18589 | 8/1994 |
| WO | WO 96/10201 | 4/1996 |

OTHER PUBLICATIONS

"Introduction to DWDM Technology Data in a Rainbow", by Stamatios V. Kartalopoulos, Lucent Technologies, IEEE Communications Society, Sponsor, SPIE Optical Engineering Press, pp. 65–68.
"Introduction to DWDM Technology Data in a Rainbow", by Stamatios V. Kartalopoulos, Chapter 9, pp. 131–136.
"Distributed feedback semiconductor lasers", by John Carroll, et al., IEE Circuits, Devices and Systems Series 10, SPIE Press Monograph vol. PM52, 1998, pp. 7–15.
"Micromachining system accommodates wafers", by Robert Bann, et al., Laser Focus World –The 2001 Annual Survey of the Laser Marketplace, Jan. 2001, pp. 189–192.
Chapter 9, "Other Optical Components", pp. 131–137.
"An Introduction to Pound–Drever–Hall Laser Frequency Stabilization", Erie D. Black, Ligo Project, California Institute of Technology, LIG)–P990042–00–D, pp.1–36.

*Primary Examiner*—Jason Chan
*Assistant Examiner*—Dalzid Singh
(74) *Attorney, Agent, or Firm*—Lisa U. Jaklitsch

(57) ABSTRACT

A system and method for optimizing performance characteristics of optical networks. The system and method exploits a wavelength-locked loop servo-control circuit and methodology that enables real time adjustment of optical signals in accordance with attenuation characteristics of an optical transmission channel. Particularly, the invention enables alignment of optical signal center wavelengths and optical wavelength selective devices exhibiting a peaked passband function in optical networks utilizing information included in first derivative and second derivatives of dither modulated optical signals extracted from a feedback signal provided in the wavelength-locked loop servo-control circuit.

25 Claims, 6 Drawing Sheets

U.S. PATENT DOCUMENTS

| | | |
|---|---|---|
| 4,588,296 A | 5/1986 | Cahill et al. |
| 4,725,120 A | 2/1988 | Parzygnat |
| 4,744,617 A | 5/1988 | Hvezda et al. |
| 4,863,332 A | 9/1989 | Wiholm et al. |
| 4,870,637 A | 9/1989 | Follett et al. |
| 4,872,739 A | 10/1989 | Kahn et al. |
| 4,890,894 A | 1/1990 | Kwa |
| 4,892,376 A | 1/1990 | Whitehouse |
| 4,895,424 A | 1/1990 | Hughes |
| 4,943,136 A | 7/1990 | Popoff |
| 4,944,568 A | 7/1990 | Danbach et al. |
| 5,009,477 A | 4/1991 | Alferness et al. |
| 5,071,216 A | 12/1991 | Sullivan |
| 5,101,460 A | 3/1992 | Richard |
| 5,134,508 A | 7/1992 | Corda |
| 5,144,691 A | 9/1992 | August et al. |
| 5,155,784 A | 10/1992 | Knott |
| 5,155,785 A | 10/1992 | Holland et al. |
| 5,182,780 A | 1/1993 | Robertson |
| 5,204,925 A | 4/1993 | Bonanni et al. |
| 5,218,654 A | 6/1993 | Sauter |
| 5,228,105 A | 7/1993 | Glista |
| 5,240,617 A | 8/1993 | Hopf |
| 5,245,680 A | 9/1993 | Sauter |
| 5,247,593 A | 9/1993 | Lin et al. |
| 5,259,051 A | 11/1993 | Burack et al. |
| 5,268,981 A | 12/1993 | Shahid |
| 5,280,551 A | 1/1994 | Bowen |
| 5,283,851 A | 2/1994 | Vergnolle |
| 5,340,980 A | 8/1994 | Bianchini et al. |
| 5,367,598 A | 11/1994 | Devenish, III et al. |
| 5,371,820 A | 12/1994 | Welbourn et al. |
| 5,388,174 A | 2/1995 | Roll et al. |
| 5,402,515 A | 3/1995 | Vidacovich et al. |
| 5,786,591 A * | 7/1998 | Asahi ............... 250/226 |
| 6,222,861 B1 | 4/2001 | Kuo et al. |
| 6,317,247 B1 | 11/2001 | Yang et al. |
| 6,333,941 B1 | 12/2001 | Hung |
| 6,661,974 B1 * | 12/2003 | Akiyama et al. ............ 398/95 |

* cited by examiner

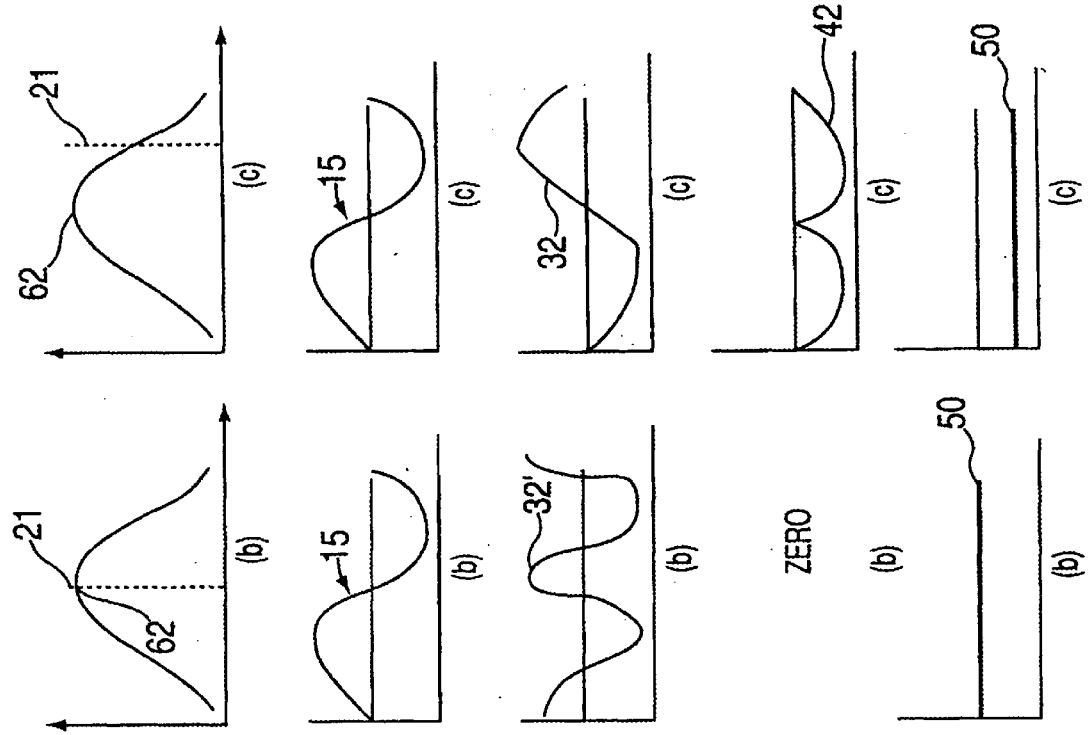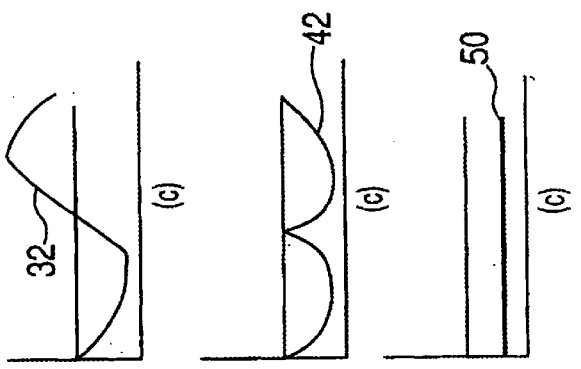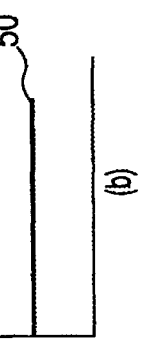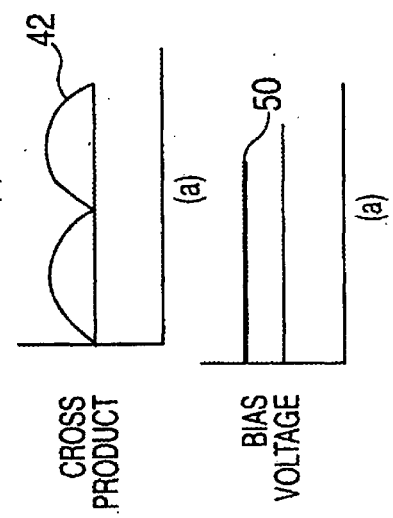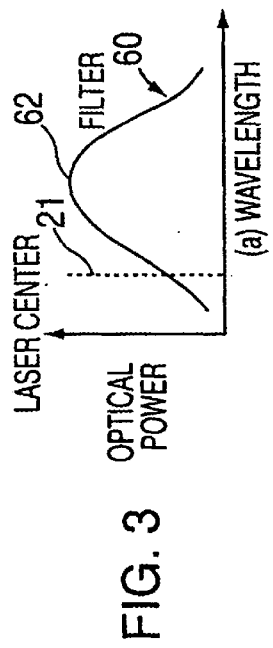

FIRST AND SECOND DERIVATIVE PROCESSING OF WAVELENGTH MULTIPLEXED OPTICAL SIGNALS

BACKGROUND OF THE INVENTION

1. Field of the Invention

The present invention relates generally to optical devices such as lasers, and fiber optic data transmission systems employing the same, and particularly to a novel wavelength-locked loop servo-control circuit for optimizing performance of optical signal processing equipment, especially equipment employed in wavelength division multiplexing (WDM) systems and dense wavelength division multiplexing (DWDM) systems.

2. Description of the Prior Art

Wavelength Division Multiplexing (WDM) and Dense Wavelength Division Multiplexing (DWDM) are light-wave application technologies that enable multiple wavelengths (colors of light) to be paralleled into the same optical fiber with each wavelength potentially assigned its own data diagnostics. Currently, WDM and DWDM products combine many different data links over a single pair of optical fibers by re-modulating the data onto a set of lasers, which are tuned to a very specific wavelength (within 0.8 mm tolerance, following industry standards). On current products, up to 32 wavelengths of light can be combined over a single fiber link with more wavelengths contemplated for future applications. The wavelengths are combined by passing light through a series of thin film interference filters, which consist of multi-layer coatings on a glass substrate, pigtailed with optical fibers. The filters combine multiple wavelengths into a single fiber path, and also separate them again at the far end of the multiplexed link. Filters may also be used at intermediate points to add or drop wavelength channels from the optical network.

A key factor in determining the ultimate detector sensitivity and bit error rate in fiber optic wavelength multiplexing systems is spectral interference at the wavelength of interest caused by overlap between adjacent wavelength bands. This form of optical crosstalk is especially important in DWDM systems, where the wavelength spacing is currently standardized at 0.8 nm and may be reduced to as little as 0.4 nm or less on next generation systems. In addition to applications in the design of WDM networking equipment, this approach is very valuable in the design of WDM optical test equipment. Weak signals at the wavelength of interest may also be nested in broadband background noise, which also limits their detection by decreasing ambient signal-to-noise ratio. This problem is additionally pertinent to spectroscopy and other forms of optical signal processing equipment.

It would thus be highly desirable to provide a system and method for automatically improving detection sensitivity in WDM and DWDM systems.

One technique which may potentially improve the detection limit by more than an order of magnitude involves measuring either the first or second derivative of the optical transmission curve with respect to wavelength. The derivative output signal is directly proportional to the optical loss (for example, due to absorption, impurities, or crosstalk) in the wavelength communication channel.

It would thus be highly desirable to provide an apparatus and method for implementing derivative measurement techniques in a practical apparatus compatible with existing WDM and DWDM network equipment.

SUMMARY OF THE INVENTION

It is therefore an object of the present invention to provide a system and method for automatically improving signal detection sensitivity in WDM and DWDM systems.

It is another object of the present invention to provide a system and method for implementing derivative measurement techniques in a practical apparatus compatible with existing WDM and DWDM network equipment.

It is a further object of the present invention to provide a system and method for implementing derivative measurement techniques for increasing signal detection sensitivity in WDM and DWDM systems that employs a servo-control loop that enables dynamic tracking of the center wavelength of an optical signal to the peak of an optical filter passband.

It is still another object of the present invention to provide a servo/feedback loop, referred to as a "wavelength-locked loop," for use in implementing derivative measurement techniques in a practical apparatus compatible with existing WDM and DWDM network equipment.

Thus, according to one aspect of the invention, there is provided a system and method for detecting optical signals in optical networks comprising: an optical signal generator for generating optical signals, each optical signal having a peaked spectrum function including a center wavelength for transmission over a communication channel; a mechanism for applying a dither modulation signal at a dither modulation frequency to the optical signal about the center wavelength; and, a wavelength-locked loop servo-control circuit for detecting a rate of change of an intensity of the dither modulated optical signal with respect to the center wavelength, the detected rate of change indicating a degree of optical attenuation in a communication system at that wavelength. The wavelength-locked loop servo-control circuit further enables real-time adjustment of the optical signal center wavelength in a manner so as to minimize optical signal attenuation in the communication channel.

According to a further aspect of the invention, there is provided a system and method for detecting optical signals in optical networks, the optical network including a receiver portion for receiving optical signals transmitted over a communications channel, the system comprising: an optical signal generator for generating optical signals, each optical signal having a peaked spectrum function including a center wavelength; a tunable wavelength selective device for receiving optical signals transmitted over the communication channel, the wavelength selective device nominally exhibiting a peaked passband function including a center wavelength; a mechanism for applying a dither modulation signal to the wavelength selective device for dithering the peaked passband function of the tunable wavelength selective device about the center wavelength, the dither modulated tunable wavelength selective device causing generation of a modulated optical signal at the dither modulation frequency; and, a wavelength-locked loop servo-control circuit for detecting a rate of change of an intensity of the dither modulated optical signal with respect to the center wavelength, the detected rate of change indicating a degree of optical attenuation in the communication channel at that wavelength. The wavelength-locked loop servo-control circuit enables real-time center wavelength adjustment of the peaked passband function of the tunable wavelength selective device in a manner so as to minimize a degree of optical signal attenuation in the communication channel.

BRIEF DESCRIPTION OF THE DRAWINGS

Further features, aspects and advantages of the apparatus and methods of the present invention will become better understood with regard to the following description, appended claims, and the accompanying drawings where:

FIGS. 3(a)–3(b) are signal waveform diagrams depicting the relationship between laser optical power as a function of wavelength for three instances of optic laser signals;

FIGS. 4(a)–4(c) are signal waveform diagrams depicting the laser diode drive voltage dither modulation (a sinusoid) for each of the three waveform diagrams of FIGS. 3(a)–3(c);

FIGS. 5(a)–5(c) are signal waveform diagrams depicting the resulting feedback error signal output of the PIN diode for each of the three waveform diagrams of FIGS. 3(a)–3(c);

FIGS. 6(a)–6(c) are signal waveform diagrams depicting the cross product signal resulting from the mixing of the amplified feedback error with the original dither sinusoid; and, FIGS. 7(a)–7(c) are signal waveform diagrams depicting the rectified output laser bias voltage signals which are fed back to adjust the laser current and center frequency.

DETAILED DESCRIPTION OF PREFERRED EMBODIMENTS

The present invention is directed to techniques for measuring the optical loss of a communication channel due to absorption, impurities, or crosstalk, for example, at specified wavelength by determining either the first or second derivative of the fiber or channel's optical transmission curve with respect to the wavelength. This is due to the recognition that the derivative output signal is directly proportional to the optical loss in the wavelength communication channel. This invention is particularly directed to a system and method for implementing derivative measurement techniques by employment of a novel servo-control system in practical optical signal processing equipment, e.g., equipment compatible with existing WDM and DWDM network equipment.

The explanations herein discuss both wavelength and frequency, which have a reciprocal relationship ($\lambda = c/f$, where c=speed of light), as is well known in the field of optics.

Figure 2A:
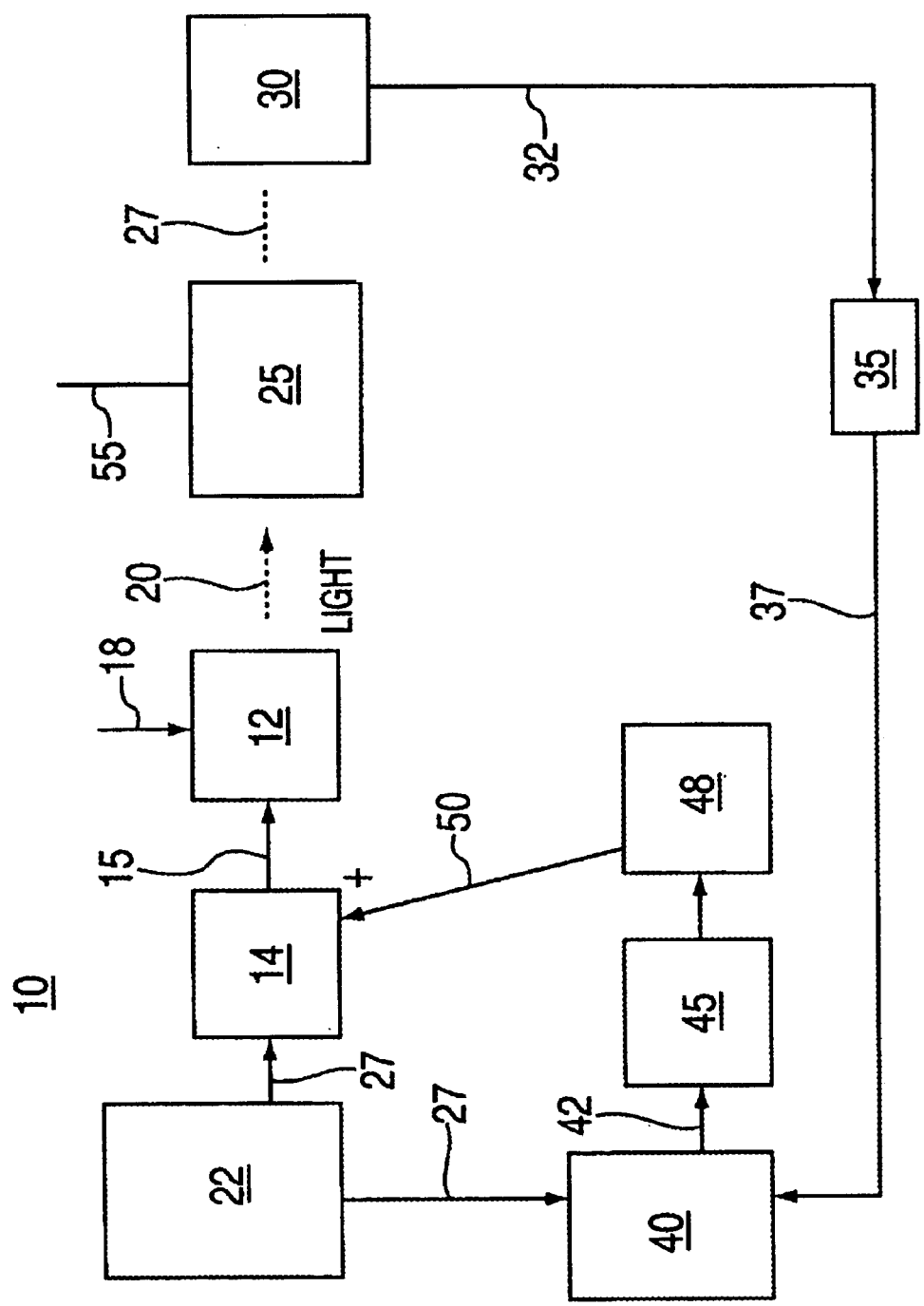
FIGS. 2(a) and 2(b) depict example underlying wavelength-locked loop system architectures.

As shown in FIG. 2(a), the novel servo-control system implements a principle referred to herein as the "wavelength-locked loop" or "lambda-locked loop" (since the symbol lambda is commonly used to denote wavelength). The basic operating principle of the wavelength-locked loop (WLL) is described in greater detail in commonly-owned, co-pending U.S. patent application Ser. No. 09/865,256, entitled APPARATUS AND METHOD FOR WAVELENGTH-LOCKED LOOPS FOR SYSTEMS AND APPLICATIONS EMPLOYING ELECTROMAGNETIC SIGNALS, the whole contents and disclosure of which is incorporated by reference as if fully set forth herein.

Particularly, as described in commonly-owned, co-pending U.S. patent application Ser. No. 09/865,256, and with reference to FIG. 2(a), the wavelength-locked loop principle implements a dither modulation to continuously adjust an electromagnetic signal source characterized as having a peaked frequency spectrum or peaked center wavelength, e.g., a laser light source, so as to track the center of a frequency selective device, e.g. a filter passband. In this manner, optimal power of the signal is transmitted and optimal use is made of the system transmission bandwidth. The principle may be exploited for tuning any light source having a peaked frequency spectrum, and additionally, may be used to tune or adjust transmission properties of frequency selective devices such as tunable filters.

For purposes of description, the basic operating principle of the WLL is shown in FIG. 2(a) which depicts an example optic system 10 including a light source such as laser diode 12 driven with both a bias voltage 15 from a voltage bias circuit 14, and modulated data 18 from a data source (not shown). The laser diode generates an optical (laser light) signal 20 that is received by a bandpass filter 25 or, any frequency selective device including but not limited to: thin film optical interference filters, acousto-optic filters, electro-optic filters, diffraction gratings, prisms, fiber Bragg gratings, integrated optics interferometers, electroabsorption filters, and liquid crystals. The laser diode itself may comprise a standard Fabry Perot or any other type (e.g., Vertical Cavity Surface Emitting (VCSEL)), light emitting diodes, or, may comprise a Distributed Feedback semiconductor laser diode (DFB) such as commonly used for wavelength multiplexing. Preferably, the laser diode emits light in the range of 850 nm to 1550 nm wavelength range. As mentioned, the bandpass filter may comprise a thin film interference filter comprising multiple layers of alternating refractive indices on a transparent substrate, e.g., glass. As further shown in FIG. 2(a), according to the invention, there is an added sinusoidal dither modulation circuit or oscillator 22 for generating a sinusoidal dither modulation signal 27 that modulates the laser bias voltage. The sinusoidal dither signal may be electronically produced, e.g., by varying the current for a laser, or mechanically, by varying the microelectromechanical system's (MEMS) mirror to vary the wavelength. The dither modulation frequency is on the order of a few kilohertz (kHz) but may range to the Megahertz range. Preferably, the dither modulation frequency is much less than the data rate which is typically on the order of 1–10 GHz. Modulation of the laser diode bias current 15 in this manner causes a corresponding dither in the laser center wavelength. Modulated data is then imposed on the laser, and the optical output passes through the bandpass filter 25. Preferably, the filter 25 is designed to tap off a small amount of light 29, for example, which is incident upon a photo detector receiver device, e.g., P-I-N diode 30, and converted into an electrical feedback signal 32. The amount of light that may be tapped off may range anywhere between one percent (1%) to five percent (5%) of the optical output signal, for example, however, skilled artisans will appreciate any amount of laser light above the noise level that retains the integrity of the output signal including the dither modulation characteristic, may be tapped off. The remaining laser light passes on through the filter 25 to the optical network (not shown). As the PIN diode output 32 is a relatively weak electric signal, the resultant feedback signal is amplified by amplifier device 35 to boost the signal strength. The amplified electric feedback signal 37 is input to a multiplier device 40 where it is combined with the original dither modulation signal 27. The cross product signal 42 that results from the multiplication of the amplified PIN diode output (feedback signal) 37 and the dither signal 27 includes terms at the sum and difference of the dither frequencies. The result is thus input to a low pass filter device 45 where it is low pass filtered and then averaged by integrator circuit 48 to produce an error signal 50 which is positive or negative depending on whether the laser center wavelength is respectively less than or greater than the center point of the bandpass filter. The error signal 50 is input to the laser bias voltage device 15 where it may be added (e.g., by an adder device, not shown) in order to correct the laser bias current 15 in the appropriate direction. In this manner, the bias current (and laser wavelength) will increase or decrease until it exactly matches the center of the filter passband. Alternately, the error signal 50 may be first converted to a digital form, prior to input to the bias voltage device.

Figure 2B:
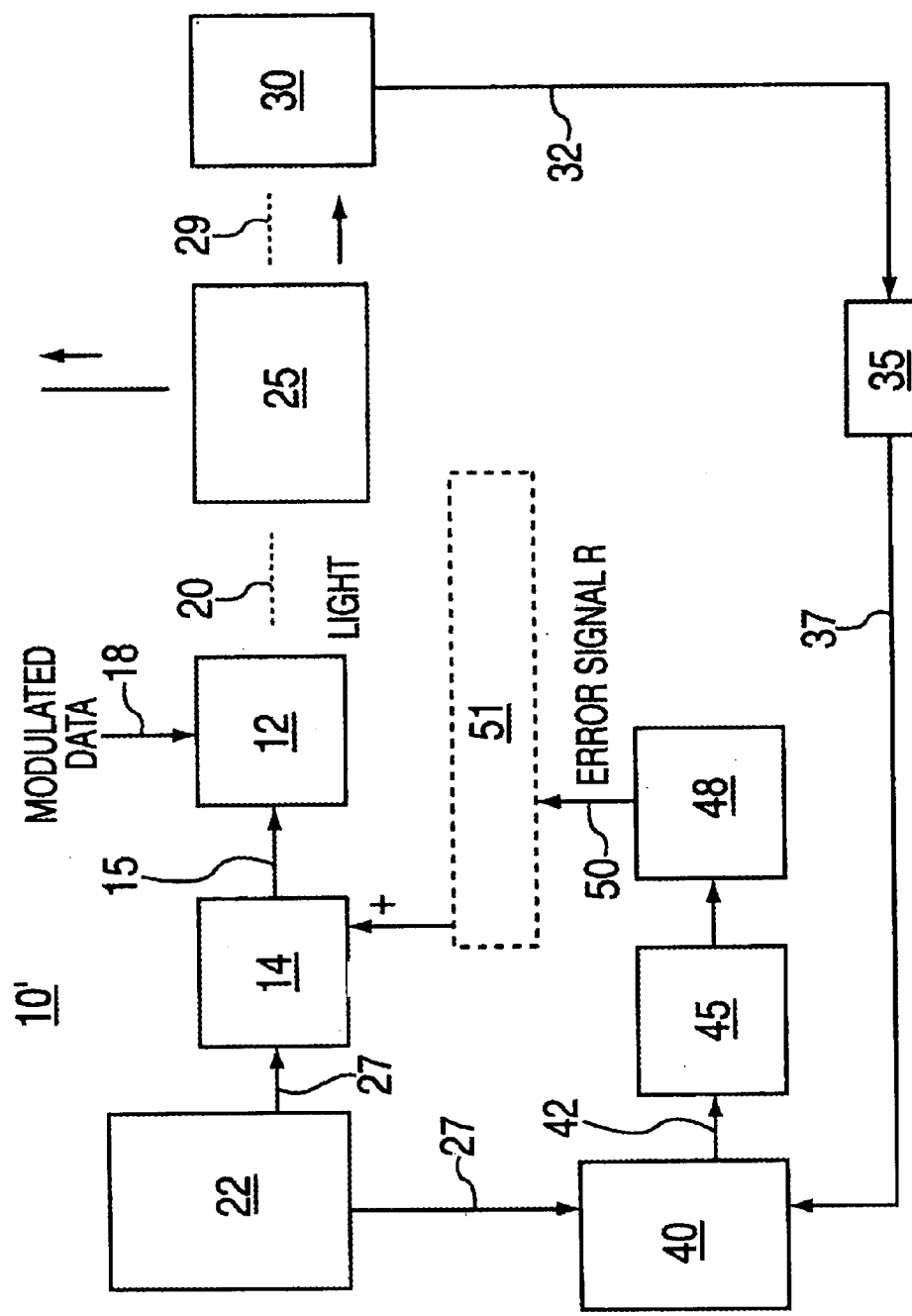

According to one aspect of the invention, the WLL will automatically maintain tracking of the laser center wavelength to the peak of the optical filter. However, in some cases, it may not be desirable to enable laser alignment to the filter peak, e.g., in an optical attenuator. Thus, as shown in FIG. 2(b) which is a system 10' corresponding to the system 10 of FIG. 2(a), there is provided an optional external tuning circuit, herein referred to as a wavelength shifter device 51, that receives the error signal and varies or offsets it so that the laser center wavelength may be shifted or offset in a predetermined manner according to a particular network application. That is, the wavelength shifter 51 allows some external input, e.g., a manual control element such as a knob, to introduce an arbitrary, fixed offset between the laser center wavelength and the filter peak.

Figure 2C:
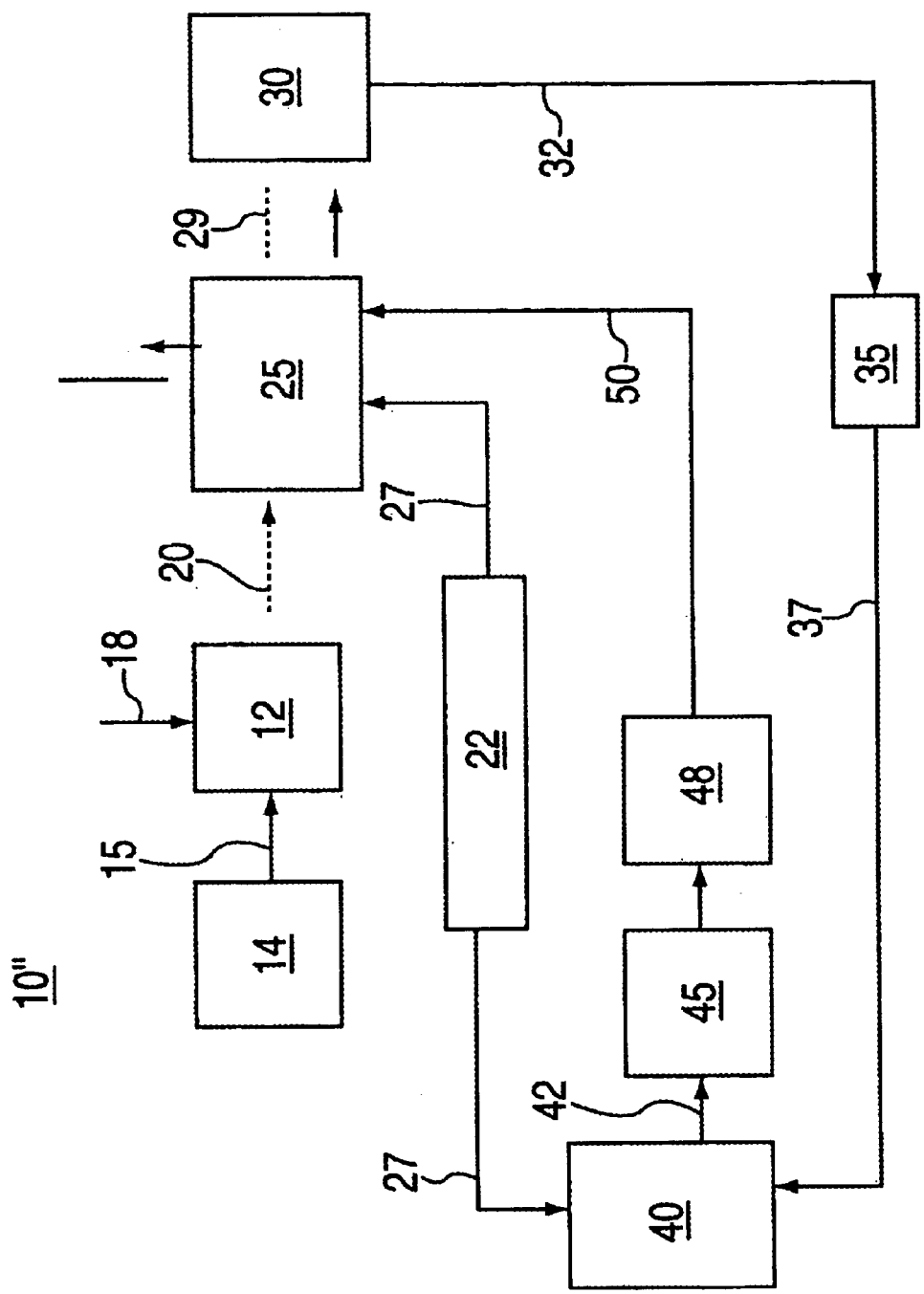
FIG. 2(c) is a general block diagram depicting the underlying system architecture for tuning tunable frequency selective devices such as a bandpass filter according to the principles of the present invention.

It should be understood that, as described in commonly-owned, co-pending U.S. patent application Ser. No. 09/865,256, the WLL servo-control system may be implemented for tuning tunable frequency selective devices such as a bandpass filter for a variety of optical network applications. Thus, in the embodiment depicted in FIG. 2(c), the system 10" comprises similar elements as system 10 (of FIG. 2(a)) including a bias voltage generator device 14 for applying a bias signal 15 to the laser diode 12 for generating an optical signal 20 having a peaked spectrum function. This signal 20 is input to a tunable frequency selective device 25, e.g., a tunable bandpass filter. As shown in FIG. 2(c), however, the sinusoidal dither/driver device 22 is implemented for modulating the peak center frequency of filter pass band with a small dither signal 27. A small amount of light 29 is tapped off the output of the filter 25 for input to the photodetector device, e.g., PIN diode 30, where the optical signal is converted to electrical signal 32, amplified by amplifier device 35, and input to the mixer device 40 which additionally receives the dither signal 27. The mixer device generates the vector cross product 42 of the amplified feedback signal 37 with the dither signal 27 and that result is low-pass filtered, and smoothed (e.g., integrated) by integrator device 48 to provide error signal 50, in the manner as will be discussed herein with reference to FIGS. 3–7. This error signal 50 may be a bi-polar signal and may be used to dynamically adjust the peak center frequency of the filter passband until it matches the center frequency of the laser signal input 20.

The operating principle of the WLL is further illustrated in the timing and signal diagrams of FIGS. 3–7. FIGS. 3(a)–3(c) particularly depicts the relationship between laser optical power as a function of wavelength for three instances of optic laser signals: a first instance (FIG. 3(a)) where the laser signal frequency center point 21 is less than the bandpass function centerpoint as indicated by the filter bandpass function 60 having centerpoint 62 as shown superimposed in the figures; a second instance (FIG. 3(b)) where the laser frequency center point 21 is aligned with the bandpass function centerpoint 62; and, a third instance (FIG. 3(c)) where the laser frequency center point 21 is greater than the bandpass function centerpoint 62. In each instance, as depicted in corresponding FIGS. 4(a)–4(c), the laser diode drive voltage signal 15 is shown dithered (a sinusoid) resulting in the laser wavelength dithering in the same manner. The dithered laser diode spectra passes through the filter, and is converted to electrical form by the PIN diode 30. In each instance of the laser signals depicted in FIGS. 3(a) and 3(c) having frequency centerpoints respectively less than and greater than the band pass filter centerpoint, it is the case that the dither harmonic spectra does not pass through the frequency peak or centerpoint of the bandpass filter. Consequently, the resulting output of the PIN diode is an electric sinusoidal signal of the same frequency as the dither frequency such as depicted in corresponding FIGS. 5(a) and 5(c). It is noted that for the laser signals at frequencies below the peak (FIG. 3(a)) the feedback error signal 32 corresponds in frequency and phase to the dither signal (FIG. 5(a)), however for the laser signals at frequencies above the peak (FIG. 3(c)) the feedback error signal 32 corresponds in frequency but is 180° opposite phase of the dither signal (FIG. 5(c)). Due to the bipolar nature of the feedback signal (error signal) for cases when the laser signal centerpoint is misaligned with the bandpass filter centerpoint, it is thus known in what direction to drive the laser diode (magnitude and direction), which phenomena may be exploited in many different applications. For the laser signal depicted in FIG. 3(b) having the laser frequency center point aligned with the bandpass function centerpoint, the dither harmonic spectra is aligned with and passes through the frequency peak (maximum) of the bandpass filter twice. That is, during one cycle (a complete round trip of the sinusoid dither signal), the dither signal passes though the centerpoint twice. This results in a frequency doubling of the dither frequency of the feedback signal 32, i.e., a unique frequency doubling signature, as depicted as PIN diode output 32' in FIG. 5(b) showing an feedback error signal at twice the frequency of the dither frequency.

Thus, in each instance, as depicted in corresponding FIG. 5(b), the resulting feedback signal exhibits frequency doubling if the laser center wavelength is aligned with the filter center wavelength; otherwise it generates a signal with the same dither frequency, which is either in phase (FIG. 5(a)) or out of phase (FIG. 5(c)) with the original dither modulation. It should be understood that, for the case where there the laser center frequency is misaligned with the bandpass filter peak and yet there is exhibited partial overlap of the dither spectra through the bandpass filter peak (i.e., the centerpoint peak is traversed twice in a dither cycle), the PIN diode will detect partial frequency doubling laser at opposite phases depending upon whether the laser center frequency is inboard or outboard of the filter center frequency. Thus, even though partial frequency doubling is detected, it may still be detected from the feedback signal in which direction and magnitude the laser signal should be driven for alignment.

Referring now to FIGS. 6(a) and 6(c), for the case when the laser and filter are not aligned, the cross product signal 42 resulting from the mixing of the amplified feedback error with the original dither sinusoid is a signed error signal either at a first polarity (for the laser signals at frequencies below the bandpass filter centerpoint), such as shown in FIG. 6(a) or, at a second polarity (for the laser signals at frequencies above the bandpass filter centerpoint), such as shown in FIG. 6(c). Each of these signals may be rectified and converted into a digital output laser bias voltage signal 48 as shown in respective FIGS. 7(a) and 7(c), which are fed back to respectively increase or decrease the laser current (wavelength) in such a way that the laser center wavelength moves closer to the bandpass filter centerpoint. For the case when the laser and filter are aligned, the cross product generated is the frequency doubled signal (twice the frequency of the dither) as shown in the figures. Consequently, this results in a 0 V dc bias voltage (FIG. 7(b)) which will maintain the laser frequency centerpoint at its current wavelength value.

The system for measuring the optical loss of a communication channel, e.g., due to absorption, impurities, or crosstalk, at specified wavelength by determining either the first or second derivative of the fiber or channel's optical transmission curve with respect to the wavelength according to the present invention is now described. Principally, a measurement is made by rapid repetitive scanning, or dithering, of a narrow wavelengths interval centered on an optical signal wavelength of interest. This periodic scan is synchronized with a tuned A.C. amplifier locked to the fundamental or harmonic multiple of a dither frequency. The modulated signal which results is the first derivative of optical intensity with respect to wavelength when the amplifier is locked to the dither frequency. At twice this frequency, the second derivative may be obtained. The signal-to-noise and signal-to-background ratios are increased by bandpass filter rejection of the low-frequency "flicker noise", commonly called 1/f noise, and the power line interference noise associated with electronic components in the system, rectifiers on the card, or some types of optical sources. Thus, noise sources of different frequencies than the modulation frequency will not pass through the phase-sensitive lock-in amplifier. Similarly, by amplitude modulation of the light beam intensity or "chopping" the source, the D.C. offset and drift (for example, due to laser aging or slow variations in temperature or bias voltage) can be eliminated. Several dither cycles can be averaged together to further improve the signal quality.

First, the physical principles underlying the first and second derivative detection schemes, is now described by way of example of a length of optical fiber provided in a DWDM optical communication system having impurities that selectively absorb light at wavelengths being used for DWDM optical communications. This absorption may be modeled as one or more "color centers" distributed along a path length x within the fiber, with each absorption center having an absorptivity $a(\lambda)$ with a concentration C of absorbers in the fiber. The Beer's Law relationship describing the exponential relation between the light intensity after passing through a length x of absorbing fiber, $I(x,\lambda)$, and the previous unattenuated intensity $I(0,\lambda)$, is expressed in equation 1) as follows:

$$I(x,\lambda)=I_0(0,\lambda)\exp(-a(\lambda)Cx) \quad (1)$$

Now, letting the intensity be time varying in a known way to represent the transmission of data or dither modulation, as described by the modulation function F(t). This variation is expressed in equation 2) as:

$$I(x,\lambda,t)=F(t)I(x,\lambda) \quad (2)$$

A first derivative of this relation is set forth according to equation 3) as:

$$dI(\lambda)/d\lambda=F(t)\exp(-a(\lambda)Cx)[dI_0(\lambda)/d\lambda-I_0(\lambda)da(\lambda)/d\lambda] \quad (3)$$

and the second derivative yields equation 4) as follows:

$$d^2I(\lambda)/d\lambda^2=F(t)\exp(-a(\lambda)Cx)[d^2I_0(\lambda)/d\lambda^2-2CxdI_0(\lambda)/d\lambda da(\lambda)/d\lambda+I_0(\lambda)c^2x^2d^2a(\lambda)/d\lambda^2] \quad (4)$$

which may be rearranged according to equation 5) as follows:

$$d^2I(\lambda)/I(\lambda)d\lambda^2=(1/I_0(\lambda))[d^2I_0(\lambda)/d\lambda^2-Cx[I_0(\lambda)d^2a(\lambda)/d\lambda^2+2dI_0(\lambda)/d\lambda da(\lambda)/d\lambda]+c^2x^2I_0(\lambda)da(\lambda)/d\lambda] \quad (5)$$

According to the invention, the first and second derivatives may be measured by selection of a lock-in amplifier peak to the dither frequency or twice the dither frequency, respectively. For most practical absorbers, particularly with sufficiently small dither intervals, $a(\lambda)$ is a slowly varying function of wavelength. If the $a(\lambda)$ term is approximated as a constant, then the third term (i.e., $(1/I_0(\lambda))c^2x^2I_0(\lambda)da(\lambda)/d\lambda$) in equation (5) above may be neglected compared with the second term; thus, the result of a single dither scan yields a signal proportional to Cx; since x is a known quantity, the absorption concentration C may be determined and used to compute the optical attenuation vs. wavelength. It is understood that this calculation may be performed by a digital circuit in real time if required for the application.

It should be understood that the same approach may be used to determine the accuracy with which the wavelength of interest is aligned with any attenuating mechanism in its path, including a wavelength selective filter in a DWDM receiver.

Figure 1A:
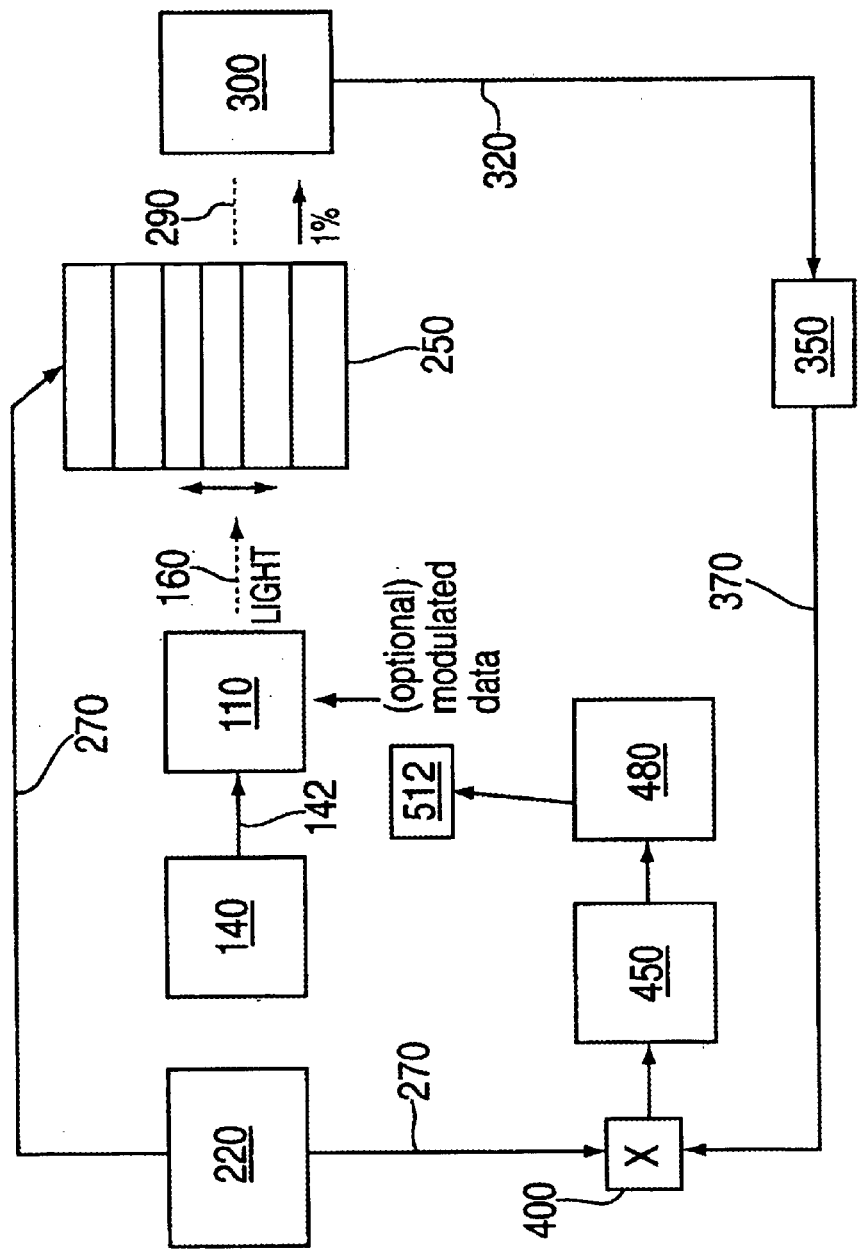
FIG. 1(a) depicts a system block diagram depicting the underlying system architecture employing the wavelength-locked loop technique in an optical system providing first and second derivative processing of wavelength multiplexed optical signals according to a first embodiment of the present invention.
Figure 1B:
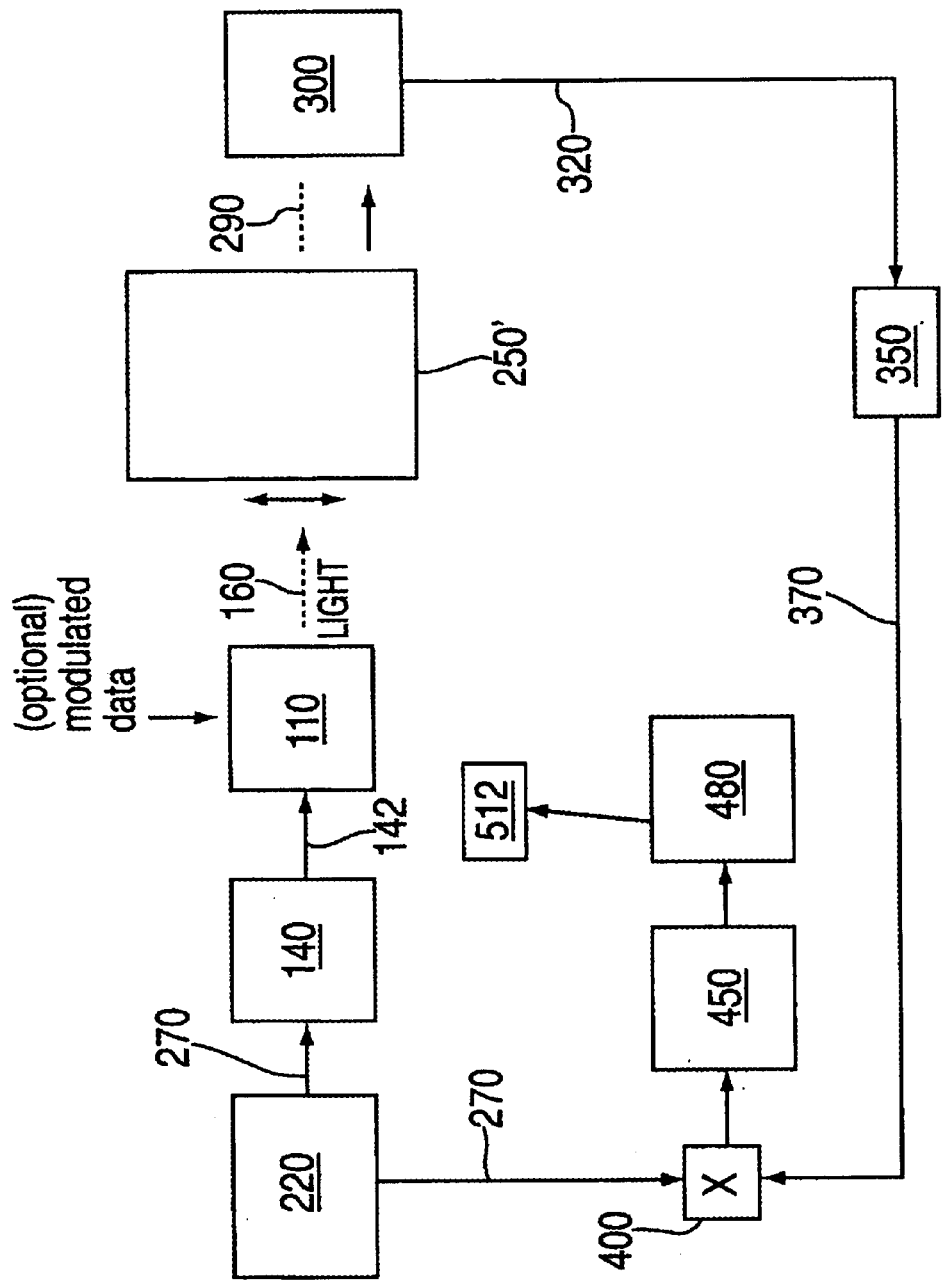
FIG. 1(b) depicts a system block diagram depicting the underlying system architecture employing the wavelength-locked loop technique in an optical system providing first and second derivative processing of wavelength multiplexed optical signals according to a second embodiment of the present invention.

The apparatus for implementing derivative techniques in DWDM systems according to the principles of the invention is designed to dither either the location of an optical filter on a mechanical mount, such as shown in FIG. 1(a), or to dither the optical wavelength with respect to the filter bandpass center frequency such as shown in FIG. 1(b). As shown in FIG. 1(a), the derivative measurement principle according to a first embodiment is applied to an optical system 100 comprising a tunable bandpass filter or wavelength selective device 250 mounted on a servo and having a variable or modulated peaked passband function. It should be understood that the filter may be optionally connected to a fiber link (not shown) and further may be integrated as part of a receiver device. The filter may comprise an electro-optic filter, diffraction grating, prism, fiber Bragg grating, integrated optics interferometer, electroabsorption filter and the like. Specifically, as shown in FIG. 1(a), the system 100 includes an optical signal generator, e.g., VCSEL laser diode device 110, for providing laser light 160 having a fixed center wavelength for transmission via an optical communication channel formed in the system. The laser diode 110 generates an optical signal 160 in response to application of a bias voltage 142 provided by a bias voltage generator device 140. As further shown in FIG. 1(a), there is provided an external oscillator 220 which generates a low frequency dither modulation signal 270 (e.g., a sinusoidal signal in the kHz frequency range or less, however adjustable as needed, in order to avoid interference with other operating frequencies in the system). As described in greater detail herein, the low frequency dither modulation signal 270 is imposed on the tunable filter device to modulate the filter response at a dither modulation frequency about its peaked passband center frequency. According to the WLL principle, the optical signal out of diode 110 is input to the dither modulated filter device 250. As further shown in FIG. 1(a), the resulting dither-modulated filtered light signal 290 output from the tunable optical filter 250 is input to a commercially available photodetector device such as P-i-N diode 300 for detecting the level of optical signal light. As further shown in FIG. 1(a), the photodetector device 300, in response, generates an electric signal 320 that is proportional to the amount of light detected. The electrical signal 320 is amplified by lock-in amplifier device 350 at a frequency corresponding to either the dither frequency, when the system is implemented for measuring the first derivative of the light intensity versus wavelength, or two times the dither frequency for measuring the second derivative of the light intensity versus wavelength. After locking in to the dither or its harmonic, the resulting signal 370, i.e., I(x, λ), signal is fed back to a mixer device 400, where it is multiplied with the low frequency modulation signal 270 from the same external oscillator 220 used to dither modulate the filter frequency response at the low modulation frequency. This results in the cross product of the two signals as described herein. Implementing low pass filter 450, the resulting signal is low pass filtered to remove higher order terms, and then integrated and optionally digitized by device 480 to result in an error signal 500 which is representative of the first derivative of the optical signal at the fixed wavelength and which may be input to a control circuit 512 for determining the amount of attenuation of the optical system at the fixed laser wavelength. According to the error signal 500 detected, the peaked passband function of the filter may be accordingly adjusted until the error signal is zero which indicates a maximum power transfer matching of the laser signal center frequency with the tuned filter passband center frequency. It should be understood that the second derivative measurement may also be used however, instead of locking in on the dither frequency, a harmonic of the dither frequency, i.e., at two times dither, may be used to adjust the tunable filter.

In the second embodiment, depicted in FIG. 1(b), the tunable filter is replaced by a frequency selective device 250' such as a bandpass filter having a peaked passband function or may comprise a fiber with color centers, or the like. Thus, in the second embodiment, rather than adjusting a tunable filter, the first derivative calculation is used to modify the bias signal 142 applied to the laser diode 110 in order to adjust the center frequency of the source signal. That is, as shown in FIG. 1(b), the external oscillator 220 generates a low frequency dither modulation signal 270 (e.g., a sinusoidal signal in the kHz frequency range or less, however adjustable as needed, in order to avoid interference with other operating frequencies in the system) that is imposed on the bias signal generator 140 in order to dither modulate the optical signal 160 about its peaked center wavelength. The laser voltage bias is thus modulated by a dithering current from the signal generator. Dither modulation of the bias voltage generator produces a corresponding dither in the light output of the filter 250' (of fixed passband response) which is monitored by the photodetector 300. In response, the photodetector generates the dither-modulated electrical signal 320 that is proportional to the amount of light detected. The electrical signal 320 is amplified by lock-in amplifier device 350 at a frequency corresponding to either the dither frequency, when the system is implemented for measuring the first derivative of the light intensity versus wavelength, or two times the dither frequency for measuring the second derivative of the light intensity versus wavelength. After locking in to the dither or its harmonic, the resulting signal 370, i.e., I(x, λ), signal is fed back to the mixer device 400, where it is multiplied with the low frequency modulation signal 270 from the same external oscillator 220 used to dither modulate the laser diode at the low modulation frequency. This results in the cross product of the two signals as described herein. Implementing low pass filter 450, the resulting signal is low pass filtered to remove higher order terms, and then integrated and optionally digitized by device 480 to result in an error signal 500 representative of the first derivative of the optical signal at the adjusted wavelength which may be input to a control circuit 512 for determining the amount of attenuation of the optical system at the adjusted laser wavelength. According to the error signal 500 detected, the center frequency of the laser signal may be accordingly adjusted until the error signal is zero which indicates a maximum power transfer matching of the adjusted laser signal center frequency with the filter fixed passband center frequency. It should be understood that the second derivative measurement may also be used however, instead of locking in on the dither frequency, a harmonic of the dither frequency, i.e., at two times dither, may be used to adjust the tunable filter.

It should be understood that, in both embodiments depicted in FIGS. 1(a) and 1(b), the optical dither feedback loop may be used to measure the first or second derivatives of the light intensity vs. wavelength functions given in the equations 3) and 5) herein. If there is any change in I(x,λ) over time (for example, as a result of adding or dropping wavelengths on the network or changing optical filters with different transfer functions) the change occurs more quickly in the higher order derivatives of I(λ). Thus, it may also be compensated more quickly by making changes in the variables which affect equation (5) above.

It should be understood that while the approach of the invention may be used to determine the accuracy with which the wavelength of interest is aligned with any attenuating element in its path in a DWDM receiver, the principles of the invention may be applied for applications including: 1) WDM interleavers and 2) dynamic background subtraction for optical amplifiers with adaptive gain and channel equalizers. Thus, by introducing wavelength sweeping or tuning, dithering may be applied at desired wavelength values in a quasi-continuous manner, thus extending applicability of the invention from discrete spectral lines to multi-line spectra.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for detecting optical signals in optical networks comprising:
   optical signal generator for generating optical signals, each optical signal having a peaked spectrum function including a center wavelength for transmission over a communication channel;
   a mechanism for applying a dither modulation signal at a dither modulation frequency to said optical signal about said center wavelength;
   a wavelength-locked loop servo-control circuit for detecting a rate of change of an intensity of said dither modulated optical signal with respect to said center wavelength, said detected rate of change indicating a degree of optical attenuation in a communication system at said wavelength, said wavelength-locked loop servo-control circuit enabling real-time adjustment of said optical signal center wavelength in a manner so as to minimize optical signal attenuation in said communication channel.

2. The system for detecting optical signals as claimed in claim 1, wherein said wavelength-locked loop servo-control circuit comprises:
   a mechanism for converting said dither modulated optical signal into an electric feedback signal;
   a mechanism for detecting a signal at said dither modulation frequency from said electric feedback signal, said signal comprising said rate of change of an intensity of said dither modulated optical signal;
   a control device for determining an attenuation of said communication channel based on said rate of change of an intensity of said dither modulated optical signal and generating a control signal representative of said degree of attenuation; and,
   a mechanism responsive to said control signal for adjusting the peak spectrum function of said optical signal in order to minimize an amount of optical signal attenuation in said channel.

3. The system for detecting optical signals as claimed in claim 2, wherein said rate of change of an intensity of said dither modulated optical signal is a first derivative of optical intensity with respect to a center wavelength, said detecting mechanism comprising a lock-in amplifier for locking said signal at said dither modulation frequency.

4. The system for detecting optical signals as claimed in claim 3, wherein said rate of change of an intensity of said dither modulated optical signal is a second derivative of optical intensity with respect to a center wavelength, said detecting mechanism comprising a lock-in amplifier for locking a signal at two times said dither modulation frequency.

5. The system for detecting optical signals as claimed in claim 2, wherein said communication channel includes a wavelength selective device for receiving and transmitting said dither modulated optical signal, said wavelength selective device exhibiting a peaked passband function including a center wavelength, wherein said adjusting mechanism automatically aligns a center wavelength of said optical signal with a center wavelength of said peaked spectrum function of said wavelength selective device.

6. The system for detecting optical signals as claimed in claim 5, wherein said adjusting mechanism comprises a level control device for receiving said control signal and dynamically adjusting an input bias signal for said optical generator, said center wavelength of said optical signal being adjusted in accordance with said input bias current changes.

7. The system for detecting optical signals as claimed in claim 2, wherein said detecting mechanism includes a mixer device capable of combining said detected signal at said dither modulation frequency with said applied dither modulation signal and generating said control signal indicating said degree of attenuation.

8. A method for detecting optical signals in optical networks comprising the steps of:
   a) generating optical signals, each optical signal having a peaked spectrum function including a center wavelength for transmission over a communication channel;
   b) applying a dither modulation signal at a dither modulation frequency to said optical signal about said center wavelength;
   c) detecting a rate of change of an intensity of said dither modulated optical signal with respect to said center wavelength, said detected rate of change indicating a degree of optical attenuation in a communication system at said wavelength; and,
   d) enabling real-time adjustment of said optical signal center wavelength in a manner so as to minimize optical signal attenuation in said communication channel.

9. The method as claimed in claim 8, wherein said detecting step c) comprises the steps of:
   converting said dither modulated optical signal into an electric feedback signal;
   extracting a signal locked at said dither modulation frequency from said electric feedback signal.

10. The method for detecting optical signals as claimed in claim 9, wherein said rate of change of an intensity of said dither modulated optical signal is a first derivative of optical intensity with respect to a center wavelength, said extracting step including locking a signal at said dither modulation frequency.

11. The method as claimed in claim 9, wherein said rate of change of an intensity of said dither modulated optical signal is a second derivative of optical intensity with respect to a center wavelength, said extracting step including locking a signal at two times said dither modulation frequency.

12. The method as claimed in claim 8, wherein said adjusting step d) comprises the steps of:
   determining an attenuation of said communication channel based on said rate of change of an intensity of said dither modulated optical signal;
   generating a control signal representative of said degree of attenuation; and,
   adjusting the peak spectrum function of said optical signal in order to minimize an amount of optical signal attenuation in said channel.

13. The method as claimed in claim 12, wherein said communication channel includes a wavelength selective device for receiving and transmitting said dither modulated optical signal, said wavelength selective device exhibiting a peaked passband function including a center wavelength, wherein said adjusting step comprises automatically aligning a center wavelength of said optical signal with a center wavelength of said peaked spectrum function of said wavelength selective device.

14. The method as claimed in claim 13, wherein said adjusting step comprises the steps of: receiving said control signal and dynamically adjusting an input bias signal for said optical generator, said center wavelength of said optical signal being adjusted in accordance with said input bias current changes.

15. A system for detecting optical signals in optical networks, said optical network including a receiver portion for receiving said optical signals transmitted over a communications channel, said system comprising:
   optical signal generator for generating optical signals, each optical signal having a peaked spectrum function including a center wavelength;
   a tunable wavelength selective device for receiving optical signals transmitted over said communication channel, said wavelength selective device nominally exhibiting a peaked passband function including a center wavelength;
   mechanism for applying a dither modulation signal to said wavelength selective device for dithering said peaked passband function of said tunable wavelength selective device about said center wavelength, said dither modulated tunable wavelength selective device causing generation of a modulated optical signal at said dither modulation frequency;

a wavelength-locked loop servo-control circuit for detecting a rate of change of an intensity of said dither modulated optical signal with respect to said center wavelength, said detected rate of change indicating a degree of optical attenuation in said communication channel at said wavelength, said wavelength-locked loop servo-control circuit enabling real-time center wavelength adjustment of said peaked passband function of said tunable wavelength selective device in a manner so as to minimize optical signal attenuation in said communication channel.

16. The system for detecting optical signals as claimed in claim 15, wherein said wavelength-locked loop servo-control circuit comprises:

a mechanism for converting said dither modulated optical signal into an electric feedback signal;

a mechanism for detecting a signal at said dither modulation frequency from said electric feedback signal, said signal comprising said rate of change of an intensity of said dither modulated optical signal;

a control device for determining an attenuation of said communication channel based on said rate of change of an intensity of said dither modulated optical signal and generating a control signal representative of said degree of attenuation; and, a mechanism responsive to said control signal for tuning said wavelength selective device in a manner so as to align said peaked passband function of said wavelength selective device with a center frequency of said transmitted optical signal.

17. The system for detecting optical signals as claimed in claim 16, wherein said rate of change of an intensity of said dither modulated optical signal is a first derivative of optical intensity with respect to a center wavelength, said detecting mechanism comprising a lock-in amplifier for locking said signal at said dither modulation frequency.

18. The system for detecting optical signals as claimed in claim 16, wherein said rate of change of an intensity of said dither modulated optical signal is a second derivative of optical intensity with respect to a center wavelength, said detecting mechanism comprising a lock-in amplifier for locking a signal at two times said dither modulation frequency.

19. The system for detecting optical signals as claimed in claim 16, wherein said tuning mechanism comprises a level control device for receiving said control signal and dynamically adjusting a center wavelength of said peaked passband function of said tunable wavelength selective device in accordance with said control signal.

20. A method for detecting optical signals in optical networks, said optical network including a receiver portion for receiving said optical signals transmitted over a communications channel, said method comprising steps of:

a) generating optical signals, each optical signal having a peaked spectrum function including a center wavelength;

b) providing a tunable wavelength selective device for receiving optical signals transmitted over said communication channel, said wavelength selective device nominally exhibiting a peaked passband function including a center wavelength;

c) applying a dither modulation signal to said wavelength selective device for dithering said peaked passband function of said tunable wavelength selective device about said center wavelength, said dither modulated tunable wavelength selective device causing generation of a modulated optical signal at said dither modulation frequency;

d) detecting a rate of change of an intensity of said dither modulated optical signal with respect to said center wavelength, said detected rate of change indicating a degree of optical attenuation in said communication channel at said wavelength; and, e) enabling real-time center wavelength adjustment of said peaked passband function of said tunable wavelength selective device in a manner so as to minimize optical signal attenuation in said communication channel.

21. The method for detecting optical signals as claimed in claim 20, wherein said detecting step d) comprises the steps of:

converting said dither modulated optical signal into an electric feedback signal; and, extracting a signal locked at said dither modulation frequency from said electric feedback signal.

22. The method for detecting optical signals as claimed in claim 21, wherein said rate of change of an intensity of said dither modulated optical signal is a first derivative of optical intensity with respect to a center wavelength, said extracting step including locking a signal at said dither modulation frequency.

23. The method for detecting optical signals as claimed in claim 21, wherein said rate of change of an intensity of said dither modulated optical signal is a second derivative of optical intensity with respect to a center wavelength, said extracting step including locking a signal at two times said dither modulation frequency.

24. The method for detecting optical signals as claimed in claim 20, wherein said adjusting step e) comprises the steps of:

determining an attenuation of said communication channel based on said rate of change of an intensity of said dither modulated optical signal;

generating a control signal representative of said degree of attenuation; and, adjusting the peaked passband function of said tunable wavelength selective device in accordance with said control signal.

25. The method for detecting optical signals as claimed in claim 24, wherein said adjusting step comprises the step of automatically aligning a center wavelength of said peaked passband function with a center wavelength of said peaked spectrum function of said transmitted optical signal.

* * * * *